Figure 1:
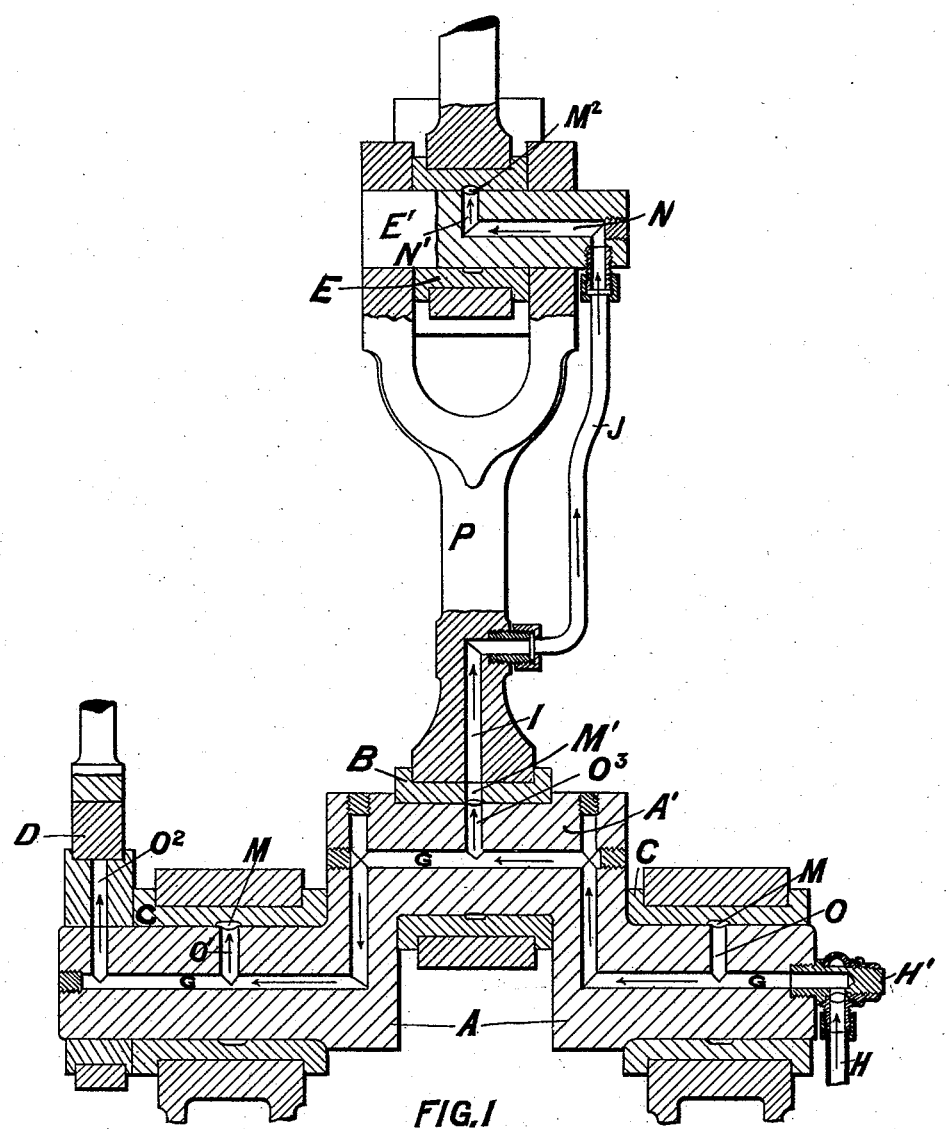

(No Model.)

A. C. PAIN.
SYSTEM OF LUBRICATION.

No. 498,689. Patented May 30, 1893.

UNITED STATES PATENT OFFICE.

ALBERT CHARLES PAIN, OF BIRMINGHAM, ENGLAND.

SYSTEM OF LUBRICATION.

SPECIFICATION forming part of Letters Patent No. 498,689, dated May 30, 1893.

Application filed April 26, 1892. Serial No. 430,803. (No model.) Patented in England May 13, 1890, No. 7,397.

*To all whom it may concern:*

Be it known that I, ALBERT CHARLES PAIN, a subject of the Queen of England, residing at Birmingham, in the county of Warwick, England, have invented an Improved System of Lubricating the Working Parts of Steam or other Engines, (for which I have obtained patent in England May 13, 1890, No. 7,397,) of which the following is a specification.

My invention consists in an improved construction and arrangement of devices for lubricating the working parts of steam or other engines whereby not only are the bearings lubricated in the most efficient manner, but the smooth working of the engine is greatly facilitated so that it is possible to run double acting engines at speeds considered practicable with single acting ones only.

In my improved system the ordinary oil cups are dispensed with, the oil, water or other lubricating liquid being introduced to the various bearings under pressure from a pump, accumulator or high level tank by a continuous system of oil ways, drilled through the shaft or journal, with holes radiating therefrom to the surfaces to be lubricated as hereinafter described.

The bearing and working parts are inclosed in a suitable casing not shown in the drawings which may or may not form part of the engine framing, and the lubricating fluid escaping from the journals is thereby prevented from being thrown about and is returned into the basin or "save-all" from which the pump takes its supply. The bearings may be fitted with packing or other device for retarding the escape of the lubricant if considered advisable.

The advantages derived from the application of my new system are:—First—that the lubricant being introduced under pressure will immediately fill any spaces that may exist between the journal and bearings and thus conduce to the smooth working of the engine, and the said engine may be run at a higher speed than hitherto found practicable without knocking. Second—the bearings are very efficiently lubricated, a film of oil being constantly maintained between the surfaces whereby the loss of power due to friction is reduced to a minimum and wearing of journal or other bearings prevented. Third— that the constant passage of the lubricant fluid between the surfaces of the bearing has a considerable cooling effect. Fourth—on account of the application of pressure a cheaper form of lubricant may be used having less body. Fifth—that when the pump is driven directly by the engine itself the system of lubrication becomes essentially automatic and the engine may be run continuously for long periods and with a minimum of attention.

I will now proceed to describe with reference to the accompanying drawings the manner in which my invention is to be practiced.

Figure 2:
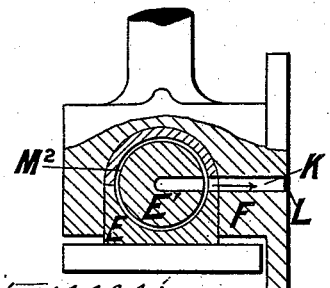

Figure 1 represents in vertical section my improved system of lubrication applied for the purpose of illustration to the principal bearings of an ordinary vertical single crank steam engine and Fig. 2 represents in section an elevation the cross head bearing and guide shoe of the same, the sectional part of Fig. 2 being taken in a plane at right angles to that in which the corresponding part of Fig. 1 is taken.

The same of letters of reference indicate the same parts in both figures.

A is the crank shaft; B the crank pin bearing.

C, C are the two main bearings on either side of the crank pin bearing B.

D is the eccentric sheave; E the cross head bearing and F the cross head guide shoe best seen in Fig. 2.

In the crank shaft A the continuous central oil way G, G, G is drilled. From this central oil way other oil ways radiate marked respectively O, O', $O^2$, and $O^3$. It will be seen by an examination of the drawings that the branch or radial oil ways O and O' convey the oil from the central way G to the two main bearings C, C of the crank shaft and the radial oil way $O^2$ conveys the oil to the eccentric sheave D while the radial oil way $O^3$ conveys the oil to the crank pin bearing B. Each of the radial oil ways O, O' and $O^3$ opens and delivers the oil to circumferential or annular grooves M and M' turned in the inner surfaces of the respective brasses or bearings as represented in the drawings.

The lubricant under pressure produced by a pump, hydraulic accumulator or high level tank is introduced at one end of the central oil way G by a pipe H connected to said oil way by a swivel joint H'. From the central oil way G the oil under pressure is conveyed to the branch or radial oil ways O, O', $O^2$, $O^3$ and is delivered into the circumferential or annular grooves in the interior of the brasses B, C, C and to the eccentric sheave D whereby the efficient lubrication of the said brasses and sheave is produced.

Instead of conveying the oil or lubricant under pressure direct to the end of the main or central oil way as represented in the drawings the said oil or lubricant may be conveyed first through holes drilled in the caps and brasses of one or both of the main bearings C,C and communicating with the circumferential or annular grooves M, M' and thence by the radial or branch oil ways O, O' to the central oil way G and parts in connection herewith. The lubricating fluid may be introduced to the continuous system of channels, at any other point which the exigencies of the particular design may render desirable. When the cross head pin bearing is to be lubricated from the oil way by which the crank shaft bearings and eccentric sheave are lubricated the arrangement represented in Fig. 1 is employed. That is to say opening into the groove M' around the crank pin A' is an oil way I, drilled in the connecting rod P, the said oil way I, being connected by the outside pipe J to the oil way N represented as passing through the axis of the cross head pin E' from which last named oil way the radial oil hole N' represented passes to the circumferential or annular groove $M^2$ in the cross head pin bearing E. From the groove $M^2$ another oil hole K (see Fig. 2) leads to the cross channel L in the face of the guide shoe F, Fig. 2. The face of the other guide shoe not represented is lubricated in a similar way. The bearing of the cross head pin and the faces of the guide shoes are thus efficiently lubricated.

The surplus lubricating oil or fluid escaping from the bearings and other working parts may be collected in a "save-all" not represented in the drawings from which "save-all" the pump feeding the main or central oil way and the oil ways and pipes in communication with it takes its supply.

By the method described and illustrated of lubricating the bearings and working parts of steam or other engines the advantages obtained over the ordinary system have hereinbefore been pointed out.

Although I have only described and illustrated my invention as applied to the lubricating of the principal bearings of an ordinary single crank steam engine, yet I wish it to be understood that my improved system of lubricating is applicable to the bearings and working parts of steam engines of other kinds and to engines generally.

Having now particularly described and ascertained the nature of my said invention and in what manner the same is to be performed, I declare that what I claim is—

In a system of forced lubrication, the combination of a shaft or journal having a continuous central oil way provided with a radial branch leading to the periphery of said shaft or journal, a bearing having its inner surface provided with a circular groove or channel that communicates with said radial branch, a cross-head-pin having an oil way therein, a bearing for said cross-head-pin, said bearing having a circular groove or channel that communicates with the oil way of said pin, a guide shoe having an oil way that communicates with the oil way in the cross-head-pin and its bearing, and an oil way that connects the oil way of the cross-head-pin with the grooved bearing of the shaft or journal, substantially as described.

In testimony whereof I have hereunto set my hand and affixed my seal in presence of two subscribing witnesses.

ALBERT CHARLES PAIN. [L. S.]

Witnesses:
DUGALD CLERK,
WILLIAM EVANS.